United States Patent [19]
Anderl et al.

[11] 3,900,772
[45] Aug. 19, 1975

[54] DIGITALLY VARIABLE CAPACITOR

[75] Inventors: Josef H. Anderl, Eatontown; Albert C. Colaguori, Long Branch, both of N.J.

[73] Assignee: The United States of America as represented by the Secretary of the Army, Washington, D.C.

[22] Filed: Oct. 29, 1974

[21] Appl. No.: 518,448

[52] U.S. Cl. .............................. 317/250; 317/249 R
[51] Int. Cl.[2] ........................................... H01G 5/16
[58] Field of Search ......................... 317/249 R, 250

[56] References Cited

UNITED STATES PATENTS 2,303,564 12/1942 Lovell ............................ 317/249 R
3,646,413 2/1972 Oomon .......................... 317/249 R

*Primary Examiner*—E. A. Goldberg
*Attorney, Agent, or Firm*—Nathan Edelberg; Robert P. Gibson; Arthur Boatright

[57] ABSTRACT

This invention describes a remotely operated digitally variable capacitor. More particularly, the invention relates to remote rapid tuning of selector circuits in receivers and transmitters and of matching networks. Capacity values are available in discrete multiples of a selected unit, for example, one picofarad. Such capacitor consists of elements which provide capacity changes of 1pf, 2pf, 4pf, 8pf etc.

4 Claims, 2 Drawing Figures

DIGITALLY VARIABLE CAPACITOR

BACKGROUND OF THE INVENTION

The present invention relates generally to a variable capacitor, which allows for rapid tuning of selector circuits in receivers and transmitters as well as antenna matching networks.

PRIOR ART

In certain prior remotely tuned capacitors, a bimorph element was used. Such capacitors were unsatisfactory because of vibration chattering, and because a complex closed loop tuning arrangement was necessary. Also, tuning was done manually.

SUMMARY OF THE INVENTION

A digitally variable capacitor that comprises a sheet metal comb where the tip areas of the comb fingers are different and are movable toward and away from a common electrode. An independently controllable activator is provided for each finger of the comb. Each activator is remotely controllable electrically.

The present invention overcomes the vibration drawback of the prior art. Vibration normally produced when this type capacitor is used in vehicle mounted communications equipment is eliminated. Furthermore, values of the capacitors is in discrete steps. This allows open looped tuning and control with a digital code. Fast response, that is, of the order of milliseconds with negligible power consumption is a further advantage of this device.

DESCRIPTION OF THE PREFERRED EMBODIMENT

Figure 1:
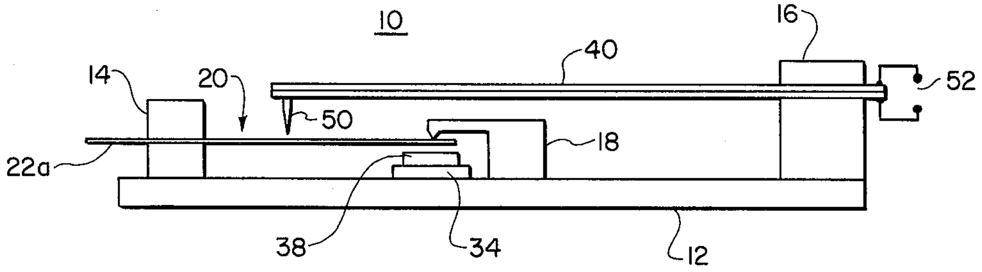
FIG. 1 is an end view of a digitally variable capacitor.
Figure 2:
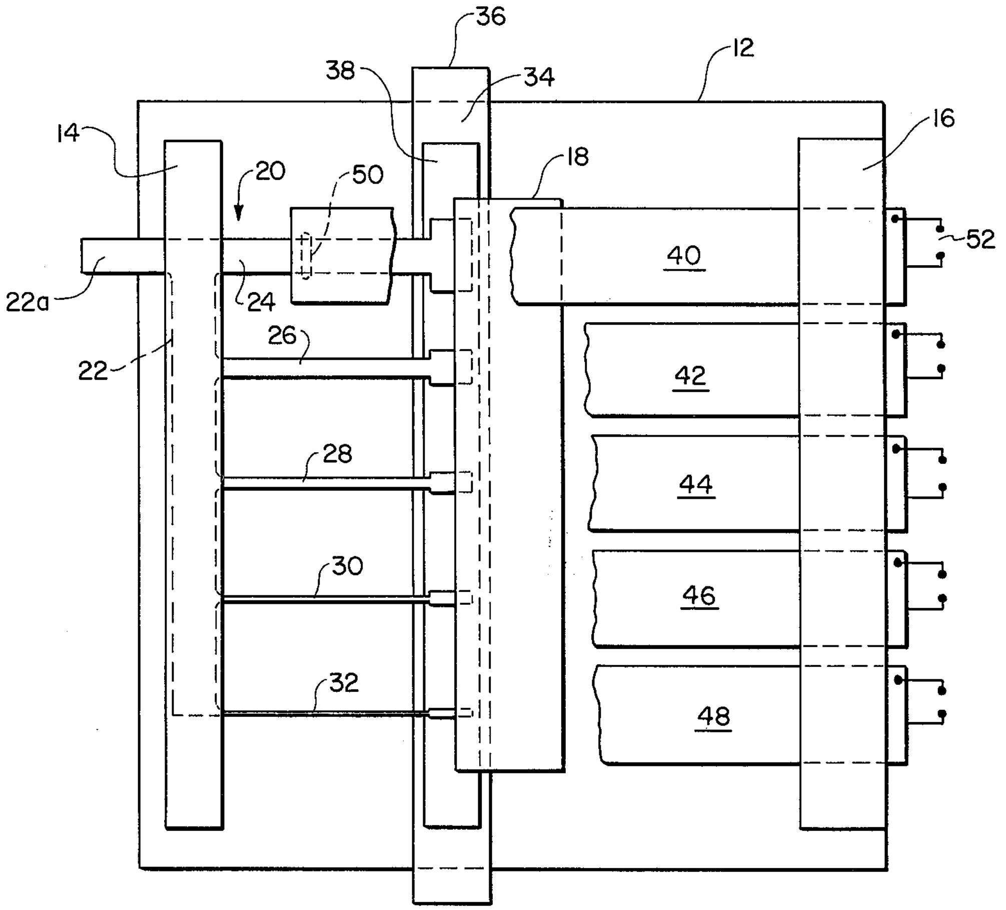
FIG. 2 is a plan view, partially broken away, of the digital variable capacitor shown in FIG. 1.

Referring to the drawing, there is shown a digitally variable capacitor 10. The capacitor 10 includes a base 12 and three insulator posts 14, 16, 18 affixed to the base 12. Post 14 is situated along one side of the base support 12 and post 16 is situated along the opposite side of base support 12. Post 18 is supported between the posts 14 and 16 along the center of the base 12.

Post 14 cantileverly supports a conductive sheet metal comb 20 having a spine 22 that is fixed to post 14 and a plurality of parallel, flexible, resilient fingers 24, 26, 28, 30 and 32 that extend laterally from the spine. A terminal tab 22*a* extends from spine 22 and is one terminal of the capacitor. All of the comb fingers are of the same length. The free ends of the fingers are of different areas and function as capacitor elements. The areas at the ends of the successive fingers are in a geometric progression relationship. The fingers normally press against the post 18 which functions as a mechanical stop and are under spring tension when in engagement with the stop to resist vibration.

An electrode 34 is fixedly mounted on the base 12 beneath the mechanical stop portion of the post 18 and is at least long enough to extend beneath the free ends of all the comb fingers. One end 36 of electrode 34 is the other terminal of the capacitor. A thin dielectric member 38 overlays and is cemented to the electrode 34.

Post 16 supports a series of bimorph elements 40, 42, 44, 46, 48, well known in the art, in overlapping relationship with the comb fingers 24, 26, 28, 30, 32 respectively. The free end of each bimorph has an insulator prong 50. A remote voltage source 52 that may be selectively turned on or off by switch means or other circuit means not shown is provided for each bimorph and when turned on the respective bimorph (or bimorphs) bends downwardly and its prong forces the respective comb finger against the dielectric 38 to form a capacitor with the electrode 34. During the time any finger is forced against the dielectric 38 by a bimorph carried prong 50 vibration of the finger is inhibited by the continuing force exerted by the bimorph; when the energized bimorph is deenergized, the bimorph resumes its earlier configuration releasing the corresponding finger which separated from the dielectric 38 and ceases to constitute a capacitor with electrode 34 and reengages the mechanical stop 18.

The areas of the free ends of the fingers 24, 26, 28, 30, 32 may be designed so that the capacity of capacitor 10 may be varied digitally in binary fashion. For example, the finger ends may be designed so that the capacity values will be 1pf or integral multiples of 1pf up to 31 pf where the comb has five fingers. The comb may have other than five fingers and the elemental unit of capacitance may be other than 1pf. The number of fingers determines the number of capacity steps of the basic unit of capacitance of which the capacitor 10 is capable. The capacitor 10 has a minimum capacity which is the stray capacitance; the stray capacitance adds to the selected digital value of capacitance.

The capacitor described is advantageous for inclusion in remote rapidly tunable frequency selector circuits in receivers, transmitters, and in antenna matching networks.

What is claimed is:

1. A digitally variable capacitor comprising:
- a sheet metal comb having a rigid spine and a plurality of flexible parallel resilient fingers;
- each of said fingers being of equal length, the free ends of said fingers each being capacitor elements of different areas;
- a rigid common capacitor electrode for said capacitor elements;
- a thin dielectric member affixed to said common capacitor electrode located between the common capacitor electrode and the capacitor elements, the capacitor elements being normally urged by the respective fingers away from the dielectric member, and
- an independently controllable activator for each finger of said comb for selectively forcing the respective capacitor element into engagement with the dielectric member or for releasing the finger.

2. A digitally variable capacitor as in claim 1, wherein each activator is a bimorph element.

3. A capacitor as in claim 1 further including a mechanical stop for the free end of all the fingers spaced from the dielectric members, said fingers being normally biased to engage the mechanical stop, whereby the ends of the fingers are displaceable between the mechanical stop and the dielectric member.

4. A digitally variable capacitor as in claim 1, wherein the fingers are under spring tension when in engagement with the stop to resist vibration.

* * * * *